United States Patent
Harben, Jr.

[11] 3,965,534
[45] June 29, 1976

[54] POULTRY NECK BREAKING MACHINE

[75] Inventor: Grover S. Harben, Jr., Gainesville, Ga.

[73] Assignee: Gainesville Machine Company, Inc., Gainesville, Ga.

[22] Filed: July 9, 1974

[21] Appl. No.: 486,832

[52] U.S. Cl. .................................................. 17/11
[51] Int. Cl.² ...................................... A22C 21/00
[58] Field of Search ............... 17/11, 11.3, 12, 44.1, 17/45, 1; 99/641

[56] References Cited
UNITED STATES PATENTS

| | | | |
|---|---|---|---|
| 2,854,690 | 10/1958 | O'Donnell | 17/12 |
| 2,993,228 | 7/1961 | Zebarth | 17/12 |
| 3,277,514 | 10/1966 | Hooley | 17/11 |
| 3,499,184 | 3/1970 | Frederick et al. | 17/11 |
| 3,571,845 | 3/1971 | Martin et al. | 17/11 |
| 3,805,328 | 4/1974 | Strandine et al. | 17/11 |

Primary Examiner—Louis G. Mancene
Assistant Examiner—James D. Hamilton
Attorney, Agent, or Firm—Newton, Hopkins & Ormsby

[57] ABSTRACT

A method is disclosed for breaking the necks of fowl being conveyed along a conveyor line in an inverted position for processing. The method comprises the steps of positioning neck gripping guide bars about opposite sides of a fowl neck, converging the neck gripping guide bars into gripping engagement with the neck, and striking the gripped neck with sufficient force to break the neck.

A machine is also disclosed for breaking the necks of fowl being conveyed along a conveyor line in inverted positions for processing. The machine comprises a frame and a carriage mounted to the frame for movement along an orbital path having an upper arcuate portion. At least one neck breaking blade is supported on the carriage. Cylinders are provided for reciprocally driving the blade laterally the orbital path while the carriage is moving along the upper arcuate portion of the orbital path.

11 Claims, 5 Drawing Figures

POULTRY NECK BREAKING MACHINE

BACKGROUND OF THE INVENTION

This invention relates generally to machines and methods for breaking the necks of poultry, and particularly to methods and machines for breaking the necks of fowl being conveyed along a conveyor line in an inverted position for processing.

In the commercial processing of poultry today fowls are suspended in inverted positions from shackles successively connected to a conveyor line which line is passed through a series of process stations. At one of these stations an incision is typically made in the skin of the neck of each fowl and the neck bone broken and separated. The windpipe, esophagus, and crop are then pulled out through the incision. Heretofore, neck breaking and cutting operations have been effected manually through the use of shears and the like. This manual procedure has proven tedious, lacking in uniformity of results, and expensive.

Accordingly, it is a general object of the present invention to provide improved methods of breaking the necks of fowls being conveyed along a conveyor line in an inverted position for processing.

Another general object of the invention is to provide machines for breaking the necks of fowls being conveyed along a conveyor line in an inverted position for processing.

Another object of the invention is to provide methods and machines for simultaneously breaking the necks of fowls of a group being conveyed along a conveyor line.

Another object of the invention is to provide methods and machines for breaking the necks of fowls being conveyed along a conveyor line automatically and without the need for momentarily arresting or otherwise altering the speed of the conveyor line itself.

Another object of the invention is to provide methods and machines for breaking the necks of fowls and for simultaneously making an incision in the skin of the fowls through which the windpipe, esophagus, and crop may subsequently be extracted.

Yet another object of the invention is to provide improved methods and machines for breaking the necks of fowls being conveyed along a conveyor line and which includes method steps and apparatus for guiding the necks of the fowls into position for neck breaking and cutting operations.

SUMMARY OF THE INVENTION

In one form of the invention a method is provided for breaking the neck of fowl being conveyed along a conveyor line in inverted positions for processing. The method comprises the steps of positioning neck gripping means about opposing sides of the fowl neck, converging the neck gripping means into gripping engagement with the neck, and striking the gripped neck with sufficient force to break the neck.

In another form of the invention a machine is provided for breaking the necks of fowls being conveyed along a conveyor line in inverted positions for processing. The machine comprises a frame and a carriage mounted to the frame for movement along an orbital path having an upper arcuate portion. At least one neck breaking blade is supported on the carriage. Means are provided for reciprocally driving the blade laterally the orbital path while the carriage is moving along the upper arcuate portion of the orbital path.

DETAILED DESCRIPTION OF THE DRAWING

Figure 1:
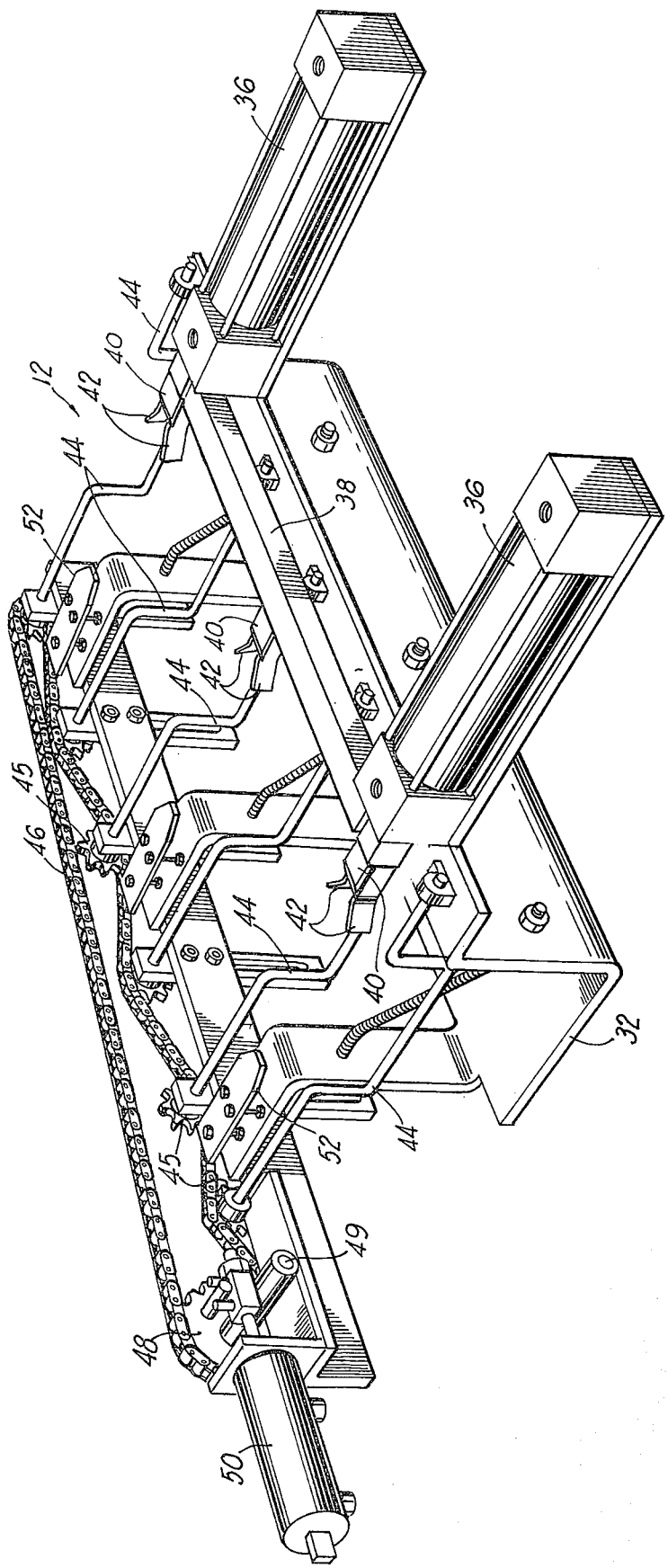
FIG. 1 is a perspective view of a carriage of a machine embodying principles of the invention in one preferred form.
Figure 2:
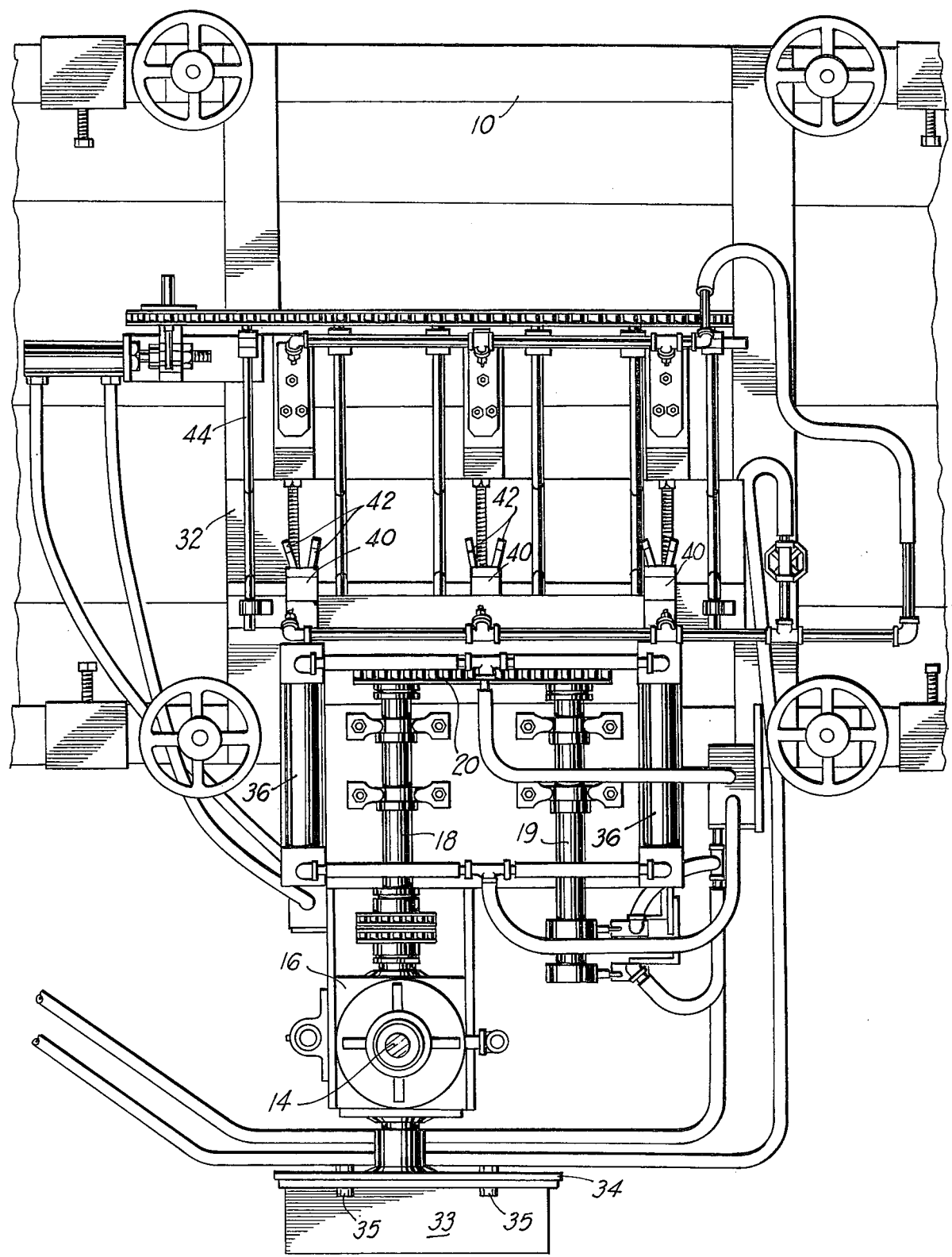
FIG. 2 is a top plan view of a machine embodying principles of the invention which includes the carriage depicted in FIG. 1.

Referring now in more detail to the drawing, there is illustrated a machine for breaking the necks of poultry which machine embodies principles of the invention in one preferred form and which machine may be used in practicing methods utilizing principles of the invention. The machine is seen to include a frame 10 which supports a carriage 12 for orbital movement. This orbital movement of the carriage is provided by a drive shaft 14 coupled to an unshown conveyor line for successively conveying fowls suspended in inverted positions from shackles attached to the conveyor line. The lower end of the drive shaft is coupled through a universal joint 15 to a gear box 16 through which driving force is transmitted from the drive shaft to a crank shaft 18 rotatably mounted to frame 10. A second shaft 19 is rotatably mounted to the frame in juxtaposition with drive shaft 18. A drive chain 20 couples the two drive shafts together whereby rotation of drive shaft 18 causes drive shaft 19 also to rotate.

To the end of crank shafts 18 and 19 are rigidly secured two crank mounting plates 22 to which two coplanar cranks 25 are rigidly secured by fastening means 26. Two parallel crank arms 28 respectively secured to each of the cranks are journalled within four pillow blocks 30 rigidly secured beneath carriage frame 32. To the opposite end of crank shaft 18 is secured a counterweight 33 by means of a counterweight mounting plate 34 and fastening means 35. Counterweight 33 is seen to be mounted diametrically opposite crank 25 with respect to crank shaft 18 whereby the weight serves to counter that of carriage 12 supported upon pillow blocks 30.

With particular reference now to FIG. 1, carriage frame 32 is seen to support a pair of parallel, hydraulic cylinders 36 having drive rods to which a cross-bar 38 is rigidly secured. To the cross-bar are also rigidly secured three spaced poultry neck breaking blades 40. A pair of V-shaped neck guide bars 42 is rigidly mounted beneath each of the blades.

With continued reference to FIG. 1 carriage frame 32 is seen to be of generally U-shaped configuration to define a trough through which the heads and necks of inverted fowls may be conveyed for breaking. Three pairs of rotatable guide bars 44 are seen to be rotatably mounted to the carriage frame spanning the defined trough. To one end of each guide bar is secured a sprocket wheel or gear 45 which wheels are disposed along a common plane. A drive chain 46 couples the sprocket wheels together with the chain passing alternately over and above adjacent wheels. The drive chain is also mounted in mesh with a drive gear 48 secured to a drive shaft 49. The drive shaft is coupled with an hydraulic cylinder 50 mounted to carriage frame 32 which cylinder reciprocally drives the rotatable drive shaft. Three parallel backing plates 52 are also mounted to frame 32 just beneath the plane of blades 40.

Figure 4:
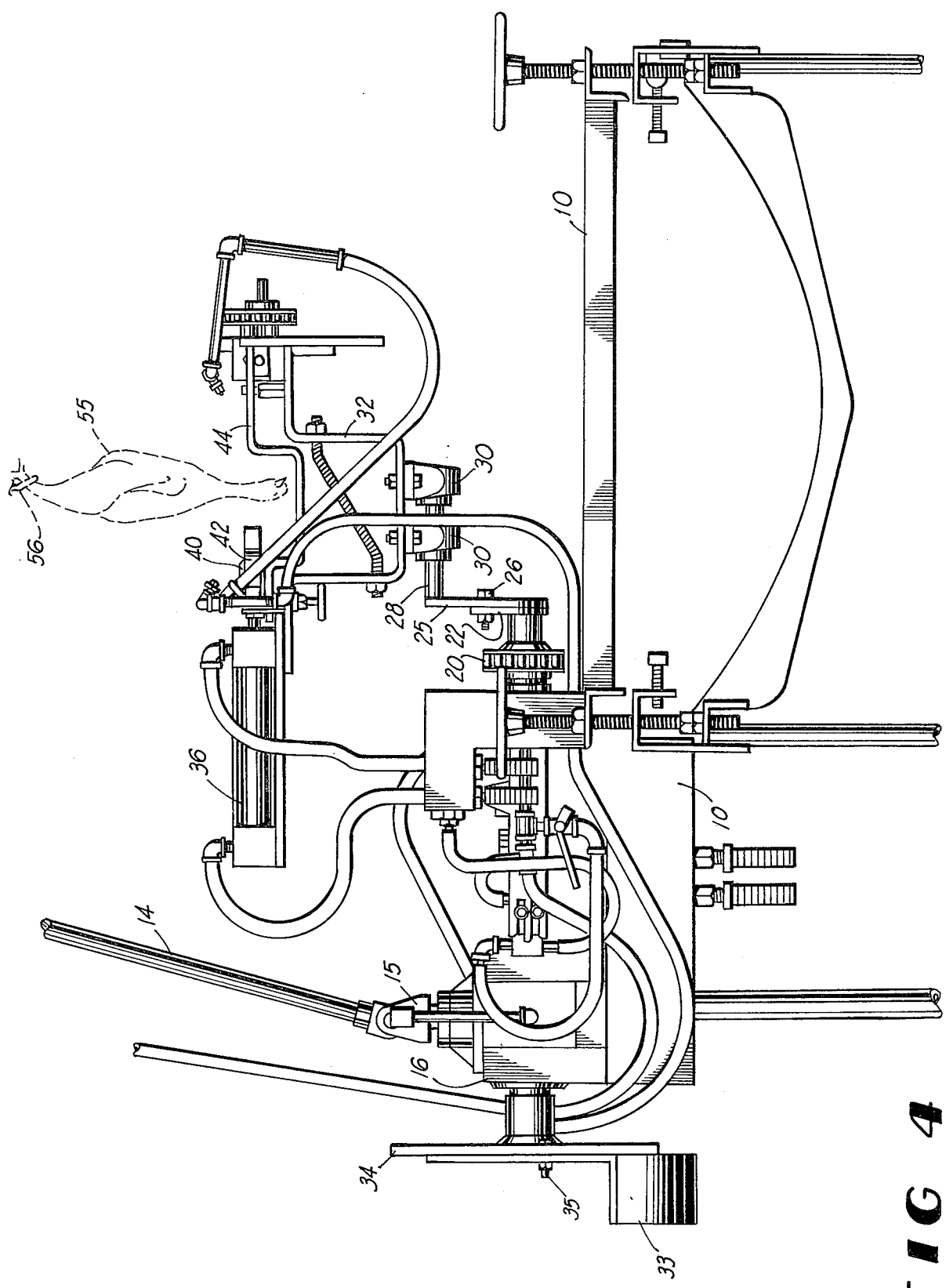
FIG. 4 is another side view in elevation of the machine shown in FIG. 2.
Figure 3:
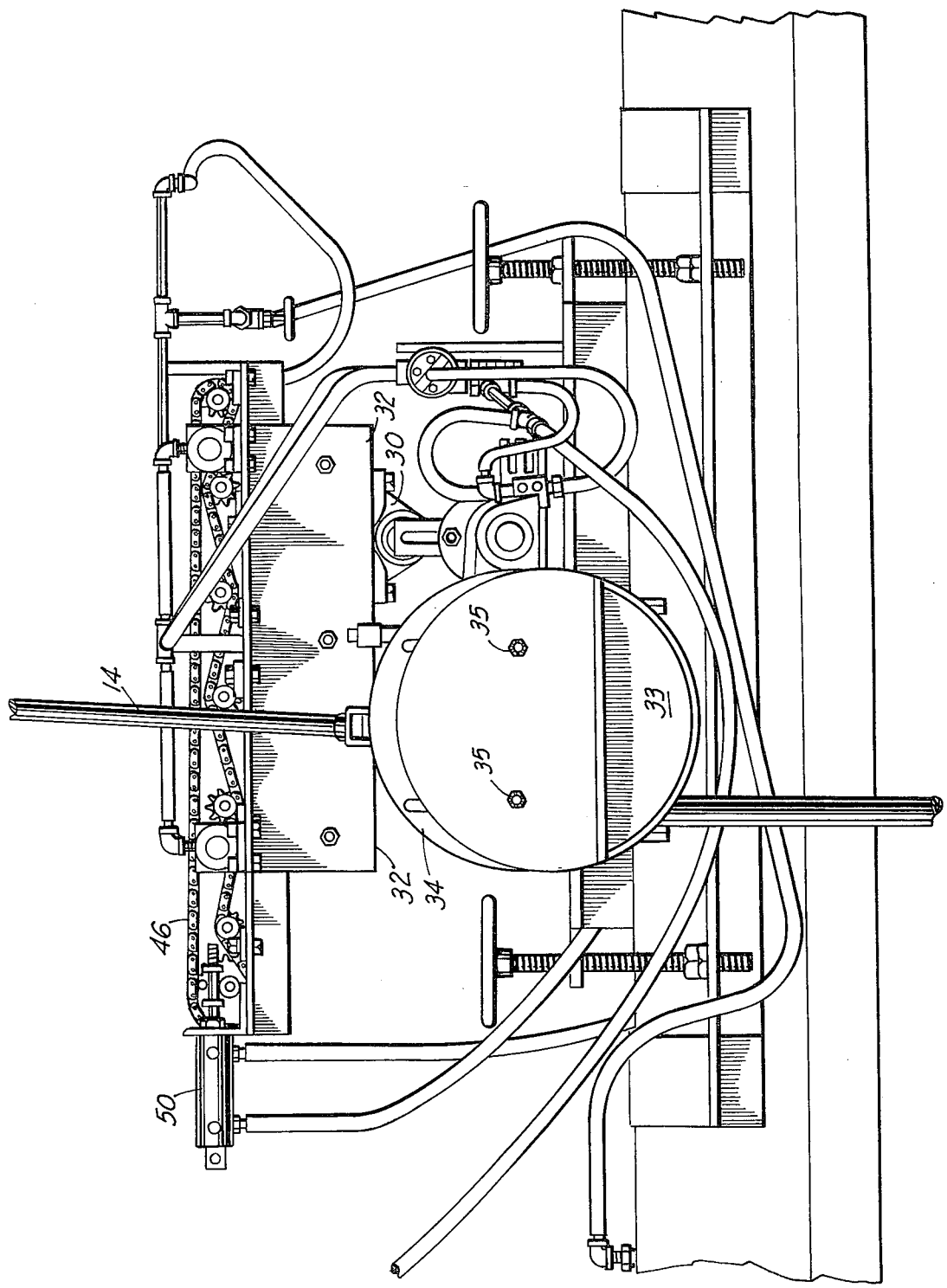
FIG. 3 is a side view in elevation of the machine illustrated in FIG. 2.
Figure 5:
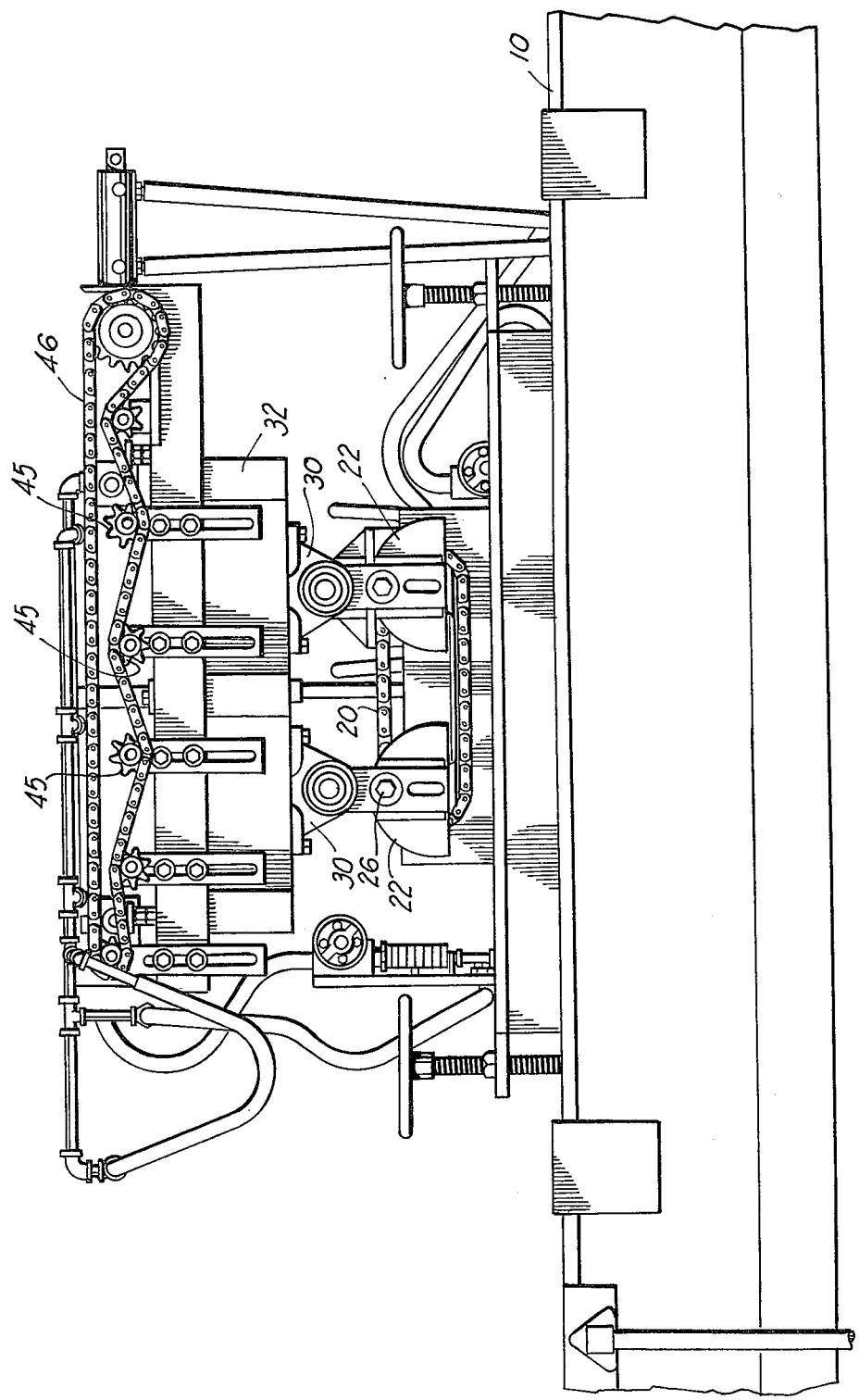
FIG. 5 is yet another side view in elevation of the machine depicted in FIGS. 2 - 4.

For operation frame 10 is disposed at a neck breaking station along a poultry conveyor line. As shown in FIG. 4 fowls 55 are hung from a set of shackles 56 suspended from the conveyor line at regular spaced intervals. The fowls are conveyed successively along a path passing above the defined trough of carriage 12. This movement of the conveyor line causes drive shaft 14 to rotate crank shafts 18 and 19 which in turn rotate parallel cranks 25. Rotation of the cranks causes carriage 12 to revolve in an orbital path disposed in a substantially vertical plane. As the carriage moves along the orbital path it maintains a substantially horizontal orientation. The gearing employed is such as to cause the carriage to make one revolution in a time required to convey three fowls past a designated point along the conveyor line. In this manner each time carriage 12 is momentarily positioned at the apex of its orbit a new set of three fowls will be positioned within the carriage trough for a neck breaking operation.

As the carriage approaches the apex of its orbit cylinder 50 is actuated causing chain 46 to move in a clockwise direction as viewed in FIG. 1. The movement of the chain causes each pair of guide bars 44 to converge beneath each blade 40. By the time the carriage has reached a position near the apex of its orbit the guide bars have both centered the necks of the fowls positioned adjacent each of the blades and come into gripping engagement therewith while keeping the bird wings clear of blade 40. Cylinders 36 are then actuated causing blades 40 to be rammed towards backing plates 52. This ramming action breaks the necks of the fowls between each blade and backing plate and also makes an incision in the skin of the neck. The movement of blade 40 is arrested just after passing above the tapered end portion of backing plates 52 which action serves to prevent the necks from being actually severed. Cylinders 36 are then reciprocated returning blades 40 to their original position on the carriage just after the carriage starts to move downwardly. This action allows the skin next to the backing plates, the esophagus and the windpipe to be stretched and to slide between the blades and plates without severing after the neck bone is broken enabling the esophagus and windpipe to be subsequently extracted and thereby extract the crop.

During the ramming motion the V-shaped guides beneath the blades serve to insure that the necks are not cocked to one side of the blade by virtue of vertical misalignment between momentary disposition of the shackle above the centered guide bars at the time of blade actuation and the guide bars themselves.

It should be understood that the just-described machine and method is merely exemplary of many which may be used in practicing the invention. Numerous modifications may, of course, be made to the specifically described machine and method without departure from the spirit and scope of the invention as set forth in the following claims.

What is claimed is:

1. A machine for breaking the necks of fowls being conveyed along a conveyor line is inverted positions for processing, said machine comprising a frame; a carriage mounted to said frame for movement along an orbital path having an upper arcuate portion; at least one neck breaking blade supported on said carriage; and means for reciprocally driving said blade laterally said orbital path while said carriage is moving along said upper arcuate portion of said orbital path.

2. The machine of claim 1 wherein said driving means includes at least one cylinder mounted to said carriage.

3. The machine of claim 1 comprising V-shaped neck guide means mounted adjacent said blade.

4. The machine of claim 1 comprising a pair of spaced guide bars rotatably mounted to said carriage and means for conveying said guide bars as said carriage moves upwardly along said upper arc and for diverging said guide bars as said carriage moves downwardly along said upper arc.

5. The machine of claim 4 wherein said converging and diverging means includes a first gear mounted to one of said guide bars, a second gear mounted to the other of said guide bars, a chain in mesh with said first and second gears, and means for reciprocally driving said chain.

6. The machine of claim 5 wherein said chain driving means includes a drive shaft rotatably mounted to said carriage, a drive gear mounted to said drive shaft in mesh with said chain, and a cylinder coupled with said drive shaft.

7. A machine for simultaneously breaking the necks of a set of spaced fowls being successively conveyed along a process line in inverted positions suspended from shackles, said machine comprising a frame; a carriage mounted to said frame for orbital movement; a set of horizontally spaced neck breaking implements supported on said carriage; means for orbiting said carriage while maintaining the horizontal spacing constant between said neck breaking implements; and means for reciprocally moving said neck breaking implements in unison on said carriage in a transverse direction with respect to the direction of said orbital movement.

8. The machine of claim 7 wherein said means for reciprocally moving said neck breaking implements includes a hydraulic cylinder.

9. The machine of claim 7 wherein said carriage is mounted to said frame for orbital movement about a substantially horizontal axis.

10. The machine of claim 7 comprising a set of horizontally spaced pairs of guides pivotally mounted to said carriage.

11. The machine of claim 10 comprising means for simultaneously converging and diverging the guides of each of said pair of guides.

* * * * *